US012247460B2

(12) United States Patent
Santos et al.

(10) Patent No.: US 12,247,460 B2
(45) Date of Patent: Mar. 11, 2025

(54) FLOAT VALVE ASSEMBLY

(71) Applicant: FORUM US, INC., Houston, TX (US)

(72) Inventors: Francis Santos, San Antonio, TX (US); Sohaib Anwer, Houston, TX (US)

(73) Assignee: FORUM US, INC., Houston, TX (US)

( * ) Notice: Subject to any disclaimer, the term of this patent is extended or adjusted under 35 U.S.C. 154(b) by 0 days.

(21) Appl. No.: 18/508,908

(22) Filed: Nov. 14, 2023

(65) Prior Publication Data
US 2024/0183247 A1     Jun. 6, 2024

Related U.S. Application Data

(60) Provisional application No. 63/429,595, filed on Dec. 2, 2022.

(51) Int. Cl.
*E21B 34/08*     (2006.01)
*E21B 34/10*     (2006.01)
*F16K 31/20*     (2006.01)

(52) U.S. Cl.
CPC .............. *E21B 34/10* (2013.01); *F16K 31/20* (2013.01)

(58) Field of Classification Search
CPC ................................ E21B 34/08; F16K 31/20
See application file for complete search history.

(56) References Cited

U.S. PATENT DOCUMENTS

| | | | |
|---|---|---|---|
| 4,532,995 A * | 8/1985 | Kaufman | E21B 21/10 166/327 |
| 5,850,881 A * | 12/1998 | Rodger | E21B 21/10 166/327 |
| 8,469,093 B2 | 6/2013 | Rondeau | |
| 8,757,268 B2 * | 6/2014 | LeJeune | E21B 21/10 166/325 |
| 9,328,585 B2 | 5/2016 | Groesbeck et al. | |
| 10,088,064 B2 * | 10/2018 | Churchill | E21B 21/10 |
| 11,242,719 B2 * | 2/2022 | Montoya | E21B 25/00 |
| 11,261,703 B1 | 3/2022 | Helms | |
| 11,421,509 B2 * | 8/2022 | Cress | F16K 17/04 |
| 2003/0047314 A1 * | 3/2003 | Allamon | E21B 21/10 166/332.8 |
| 2007/0246224 A1 | 10/2007 | Krauss et al. | |
| 2011/0290344 A1 * | 12/2011 | Groesbeck | E21B 34/16 137/430 |
| 2020/0386074 A1 * | 12/2020 | Morrison | E21B 34/10 |

FOREIGN PATENT DOCUMENTS

EP          3346088 A1     7/2018

OTHER PUBLICATIONS

"Drill Pipe Float Valves", Forum Energy Technologies, Inc., Retrieved from https://f-e-t.com/drilling/mud-systems/drill-pipe-float-valves/, 24 pages.
European Office Action dated Apr. 9, 2024 for Application No. 23213141.7.

* cited by examiner

*Primary Examiner* — Matthew R Buck
(74) *Attorney, Agent, or Firm* — Patterson + Sheridan, LLP

(57) ABSTRACT

Aspects of the present disclosure relate to float valve assemblies. The float valve assembly comprises a float sub, a first float valve having an outer housing, and a second float valve having an outer housing. The outer housings of the first and second float valves are coupled together and disposed within the float sub in a stacked configuration.

17 Claims, 7 Drawing Sheets

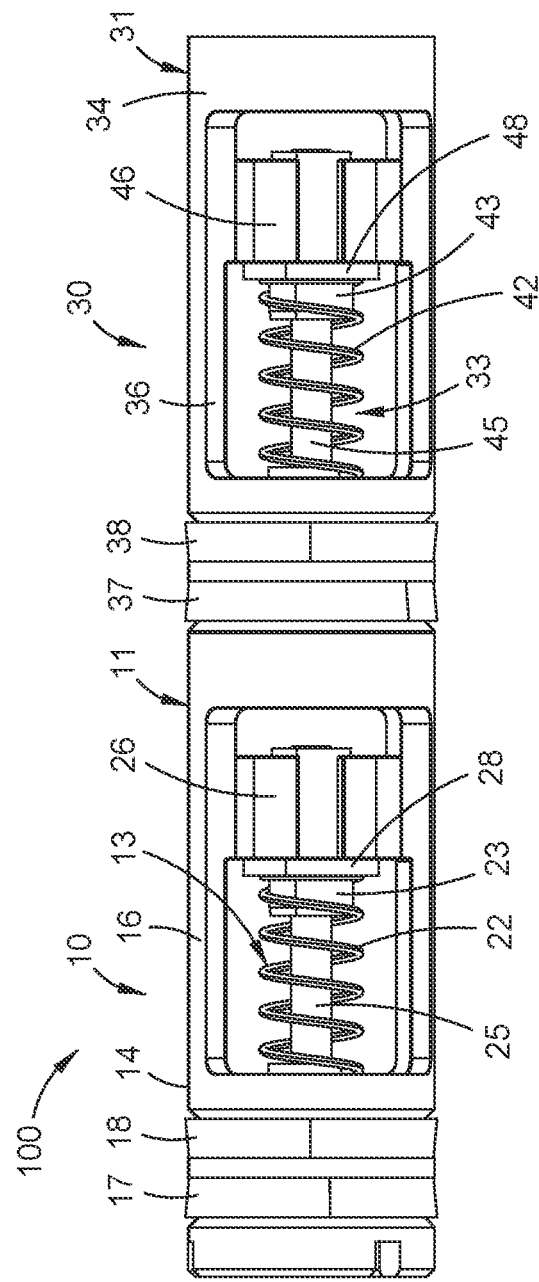

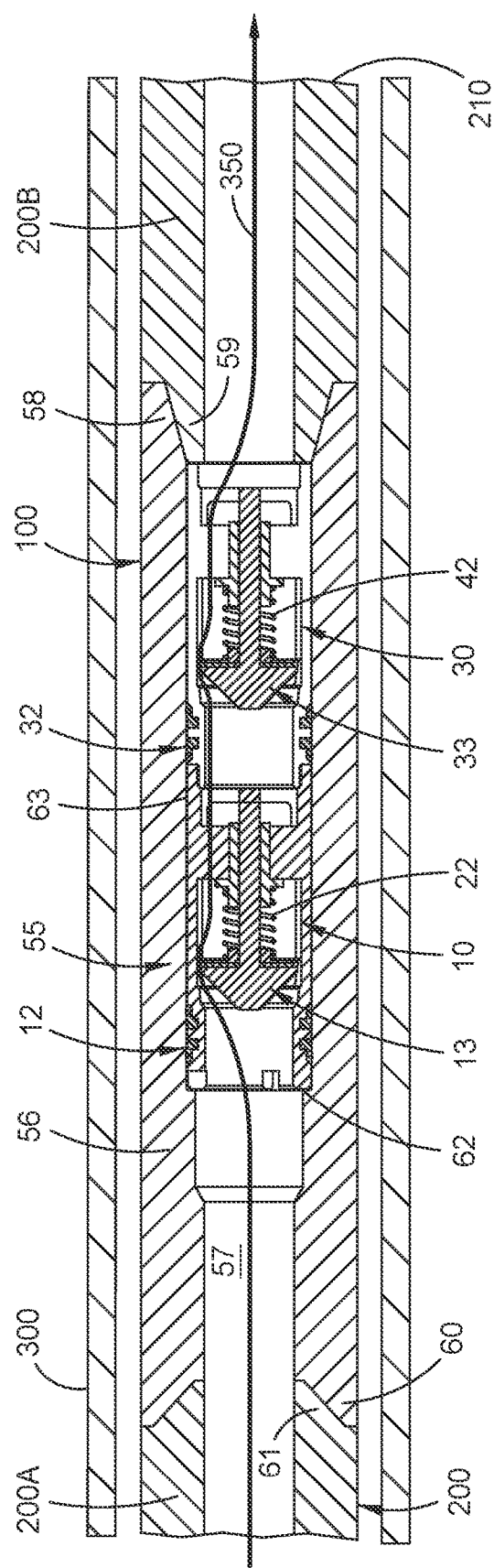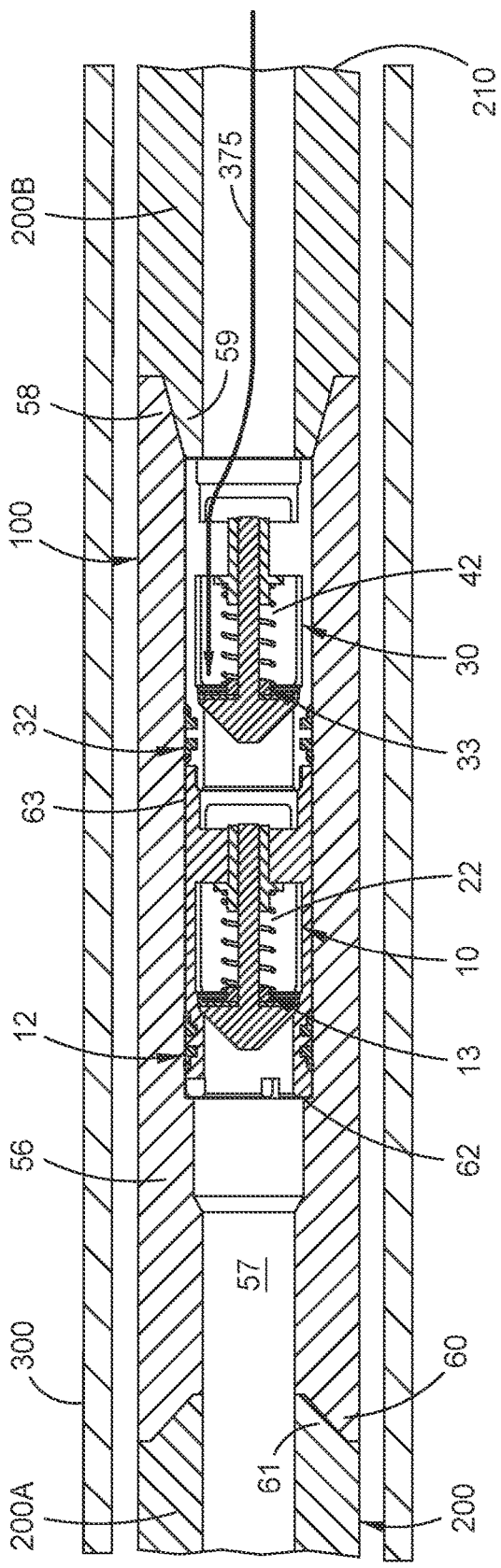

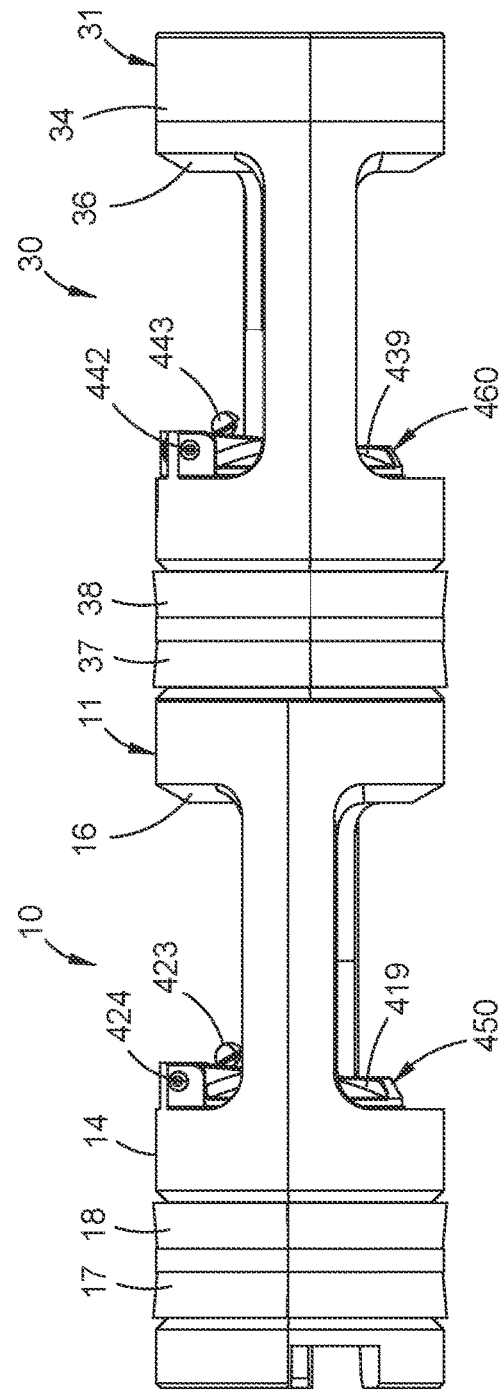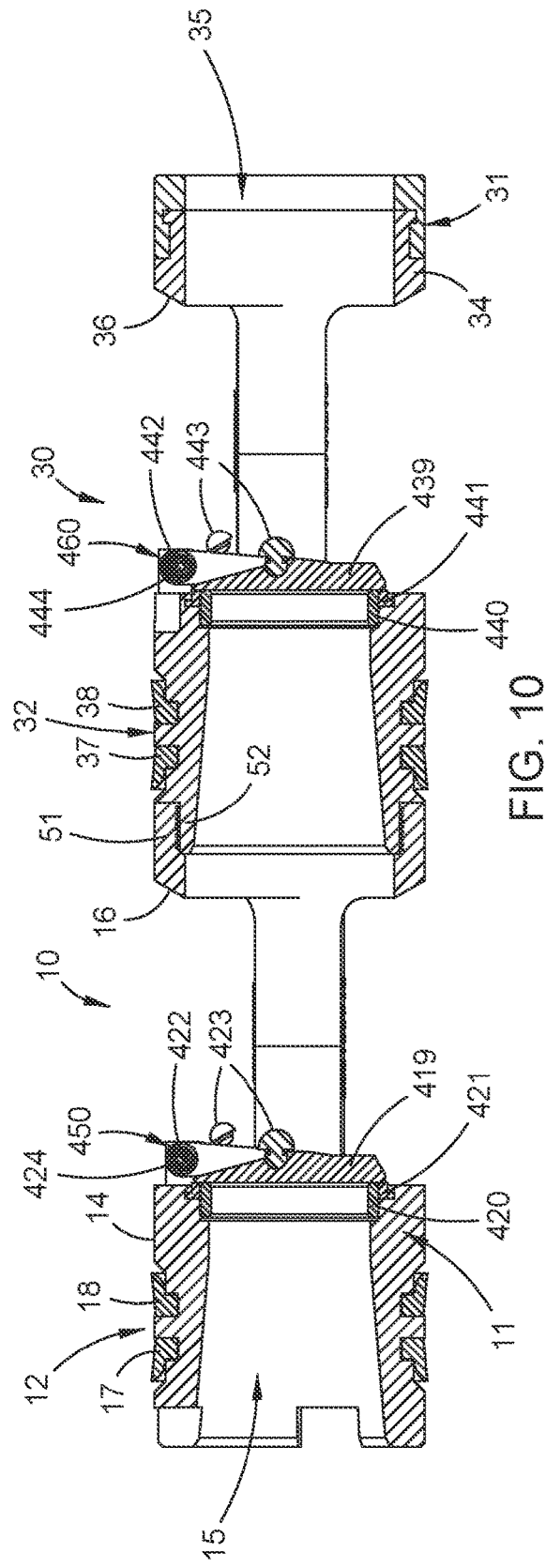

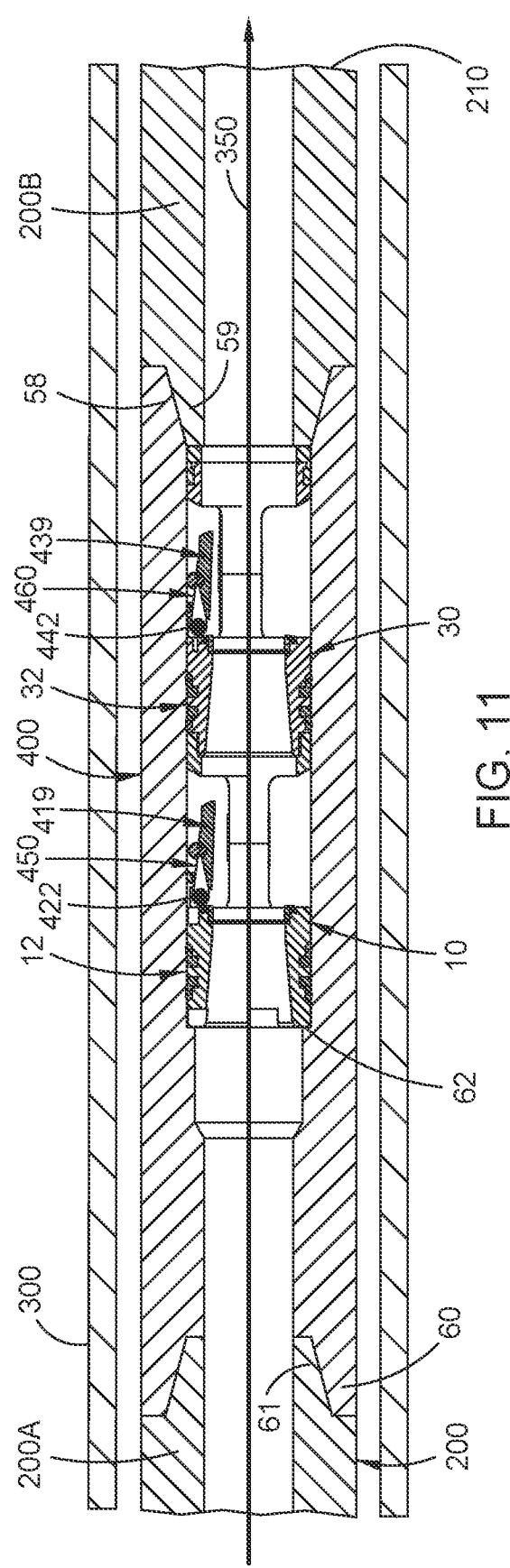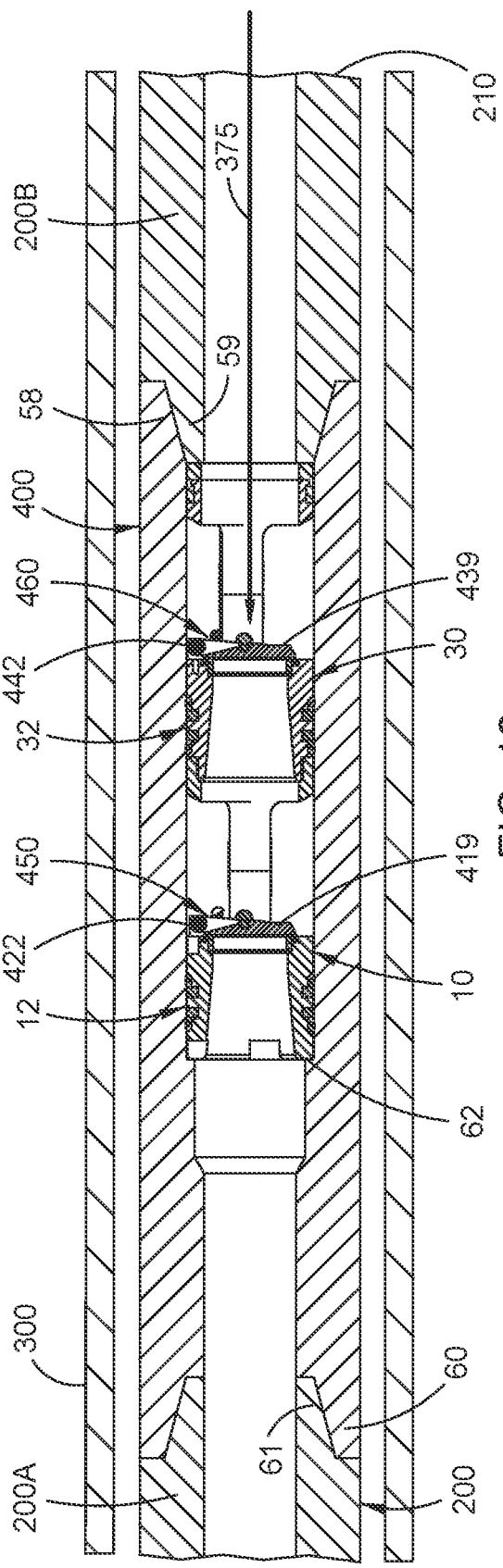

FLOAT VALVE ASSEMBLY

CROSS REFERENCE TO RELATED APPLICATIONS

This application claims benefit of U.S. provisional patent application Ser. No. 63/429,595 filed Dec. 2, 2022, which is herein incorporated by reference in its entirety.

BACKGROUND

Field

Aspects of the present disclosure relate to a float valve assembly for use in a drill string to control fluid flow through the drill string when drilling a wellbore.

Description of the Related Art

Float valves are downhole safety valves that prevent unwanted uphole flow of fluids through a drill string when drilling a wellbore. A highly density fluid, commonly referred to as drilling mud, is usually pumped down through the drill string to assist a drill bit connected to the lower end of the drill string when drilling the wellbore. However, sometimes a sudden high pressure area in the wellbore can cause fluid to flow back up the drill string. The float valves are configured to permit fluid flow down through the drill string and prevent fluid flow back up the drill string.

Although there are many different types of float valves, there is a continuous need for new and/or improved float valve assemblies.

SUMMARY

In one embodiment, a float valve assembly comprises a float sub; a first float valve having an outer housing; and a second float valve having an outer housing, wherein the outer housings of the first and second float valves are coupled together and disposed within the float sub in a stacked configuration.

In one embodiment, a drill string assembly comprises an upper drill string portion; a lower drill string portion; and a float valve assembly, which comprises a float sub; a first float valve having an outer housing; and a second float valve having an outer housing, wherein the outer housings of the first and second float valves are coupled together and disposed within the float sub in a stacked configuration; and the float sub is disposed between the upper drill string portion and the lower drill string portion.

In one embodiment, a method for drilling a wellbore comprises lowering a drill string assembly to drill the wellbore, the drill string assembly comprises an upper portion of a drill string; a lower portion of the drill string; and a float valve assembly, which comprises a float valve sub; a first float valve having an outer housing, wherein the first float valve is movable between an open position, and a closed position; and a second float valve having an outer housing, wherein the second float valve is movable between an open position and a closed position, wherein the outer housings of the first and second float valves are coupled together and disposed within the float sub in a stacked configuration; and pumping fluid through the drill string assembly in a downhole direction while drilling the wellbore.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3 is a side view of the float valve assembly of FIG. 1, according to one embodiment.

FIG. 4 is a sectional view of the float valve assembly of FIG. 1, according to one embodiment.

FIG. 5 is a sectional view of the float valve assembly of FIG. 1 coupled to a drill string, according to one embodiment.

FIG. 6 is another sectional view of the float valve assembly of FIG. 1 coupled to the drill string, according to one embodiment.

FIG. 9 is a side view of the float valve assembly of FIG. 7, according to one embodiment.

FIG. 10 is a sectional view of the float valve assembly of FIG. 7, according to one embodiment.

FIG. 11 is a sectional view of the float valve assembly of FIG. 7 coupled to a drill string, according to one embodiment.

FIG. 12 is another sectional view of the float valve assembly of FIG. 7 coupled to the drill string, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The disclosure contemplates that terms such as "couples," "coupling," "couple," and "coupled" may include but are not limited to welding, interference fitting, and/or fastening such as by using bolts, threaded connections, pins, clips, and/or screws. The disclosure contemplates that terms such as "couples," "coupling," "couple," and "coupled" may include but are not limited to integrally forming. The disclosure contemplates that terms such as "couples," "coupling," "couple," and "coupled" may include but are not limited to direct coupling and/or indirect coupling, such as indirect coupling through components such as links.

Figure 2:
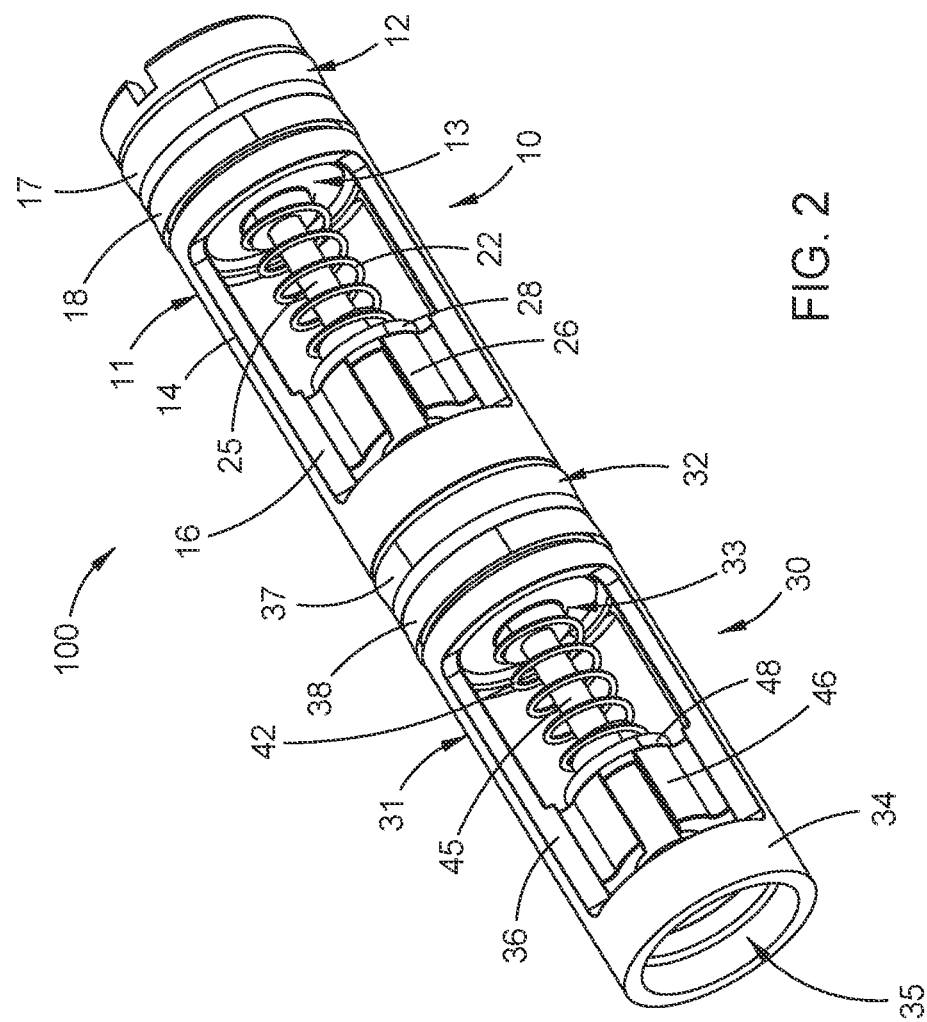
FIG. 2 is another perspective view of the float valve assembly of FIG. 1, according to one embodiment.
Figure 1:
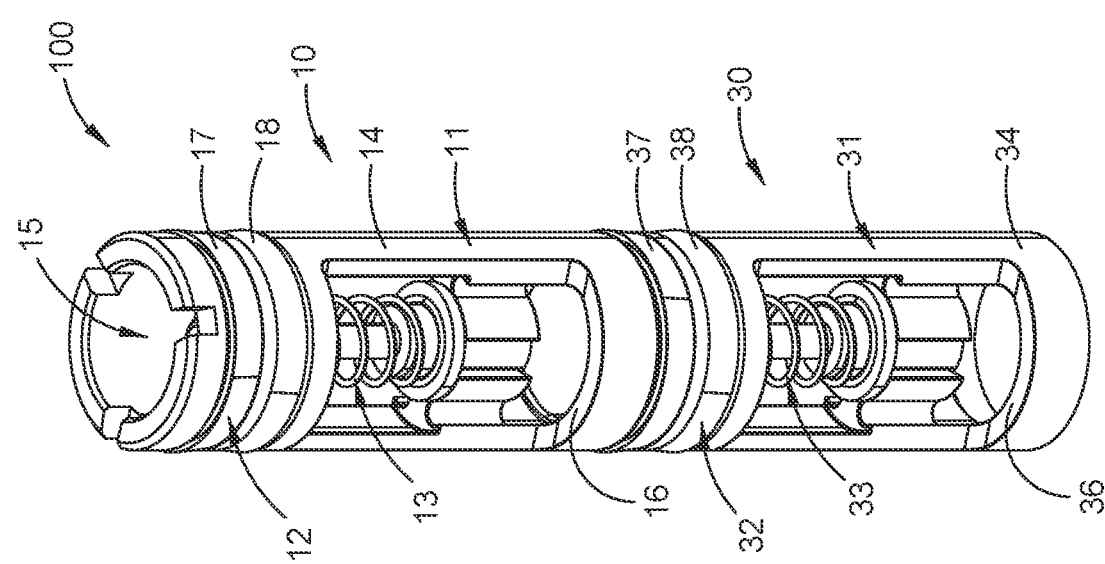
FIG. 1 is a perspective view of a float valve assembly, according to one embodiment.

FIG. 1 is a perspective view of a float valve assembly 100, according to one embodiment. FIG. 2 is another perspective view of the float valve assembly 100. FIG. 3 is a side view of the float valve assembly 100. FIG. 4 is a sectional view of the float valve assembly 100.

With reference to FIGS. 1-4, the float valve assembly 100 comprises a first float valve 10 coupled to a second float valve 30 in a stacked configuration. The coupling of the first and second float valves 10, 30 together prevents independent movement relative to each other. If not connected together, the first and second float valves 10, 30 may potentially impact one another if simply placed next to each other when installed in drill string. Specifically, pressurized fluid flow through the float valve assembly 100 may push one against the other and cause damage to the first and second float valves 10, 30.

The first float valve 10 comprises an outer housing 11, a seal assembly 12, and a plunger valve 13. The outer housing 11, also referred to as a cage, may be in the form of a cylindrical body 14 having a bore 15 formed through the cylindrical body 14. One or more openings 16 are formed through the sidewalls of the cylindrical body 14.

The seal assembly 12 is coupled to an upper end of the outer housing 11. The seal assembly 12 comprises an upper seal 17 and a lower seal 18 disposed about the upper end of the outer housing 11. The upper seal 17 seals against fluid flowing down against the outer surface of the outer housing 11, and the lower seal 18 seals against fluid flowing up against the outer surface of the outer housing 11. The seal assembly 12 therefore is configured to seal against fluid flow in both directions across the seal assembly 12.

The plunger valve 13 is coupled to the outer housing 11 and disposed in the bore 15. The plunger valve 13 comprises a valve member 19, a seal 20, a seal support member 21, a biasing member 22, and a valve guide 23. The valve member 19 comprises an upper valve head 24 and a lower valve stem 25. The upper valve head 24 is in the shape of a cone, and the lower valve stem 25 is in the shape of a cylindrical rod. The seal 20 is positioned against a lower surface of the upper valve head 24, and the seal support member 21 is positioned against a lower surface of the seal 20. The biasing member 22 is positioned between the seal support member 21 and the valve guide 23, which is coupled to and at least partially extends through an inner shoulder 26 of the outer housing 11.

The valve guide 23 comprises a bore 27 through which the lower valve stem 25 extends, and an outer shoulder 28 which abuts the inner shoulder 26 of the outer housing 11. One end of the biasing member 22 pushes against the outer shoulder 28 of the valve guide 23, and the opposite end of the biasing member 22 pushes against the seal support member 21. In this arrangement, the biasing member 22 forces the upper valve head 24 and the seal 20 against an inner sealing surface 29 of the outer housing 11.

When the seal 20 is in sealing contact with the inner sealing surface 29, the plunger valve 13 of the first float valve 10 is in a closed position, which prevents fluid flow through the first float valve 10. When an amount of pressurized fluid is applied to the upper surface of the upper valve head 24 sufficient to overcome the bias force of the biasing member 22, the upper valve head 24 and the seal 20 are moved out of sealing contact with the inner sealing surface 29, thereby compressing the biasing member 22 between the seal support member 21 and the valve guide 23, and allowing fluid flow through the bore 15 and past the plunger valve 13. When the seal 20 is not in sealing contact with the inner sealing surface 29, the plunger valve 13 of the first float valve 10 is in an open position, which allows fluid flow through the first float valve 10.

The second float valve 30 comprises an outer housing 31, a seal assembly 32, and a plunger valve 33. The outer housing 31, also referred to as a cage, may be in the form of a cylindrical body 34 having a bore 35 formed through the cylindrical body 34. One or more openings 36 are formed through the sidewalls of the cylindrical body 34.

The seal assembly 32 is coupled to an upper end of the outer housing 31. The seal assembly 32 comprises an upper seal 37 and a lower seal 38 disposed about the upper end of the outer housing 31. The upper seal 37 seals against fluid flowing down against the outer surface of the outer housing 31, and the lower seal 38 seals against fluid flowing up against the outer surface of the outer housing 31. The seal assembly 32 therefore is configured to seal against fluid flow in both directions across the seal assembly 32.

The plunger valve 33 is coupled to the outer housing 31 and disposed in the bore 35. The plunger valve 33 comprises a valve member 39, a seal 40, a seal support member 41, a biasing member 42, and a valve guide 43. The valve member 39 comprises an upper valve head 44 and a lower valve stem 45. The upper valve head 44 is in the shape of a cone, and the lower valve stem 45 is in the shape of a cylindrical rod. The seal 40 is positioned against a lower surface of the upper valve head 44, and the seal support member 41 is positioned against a lower surface of the seal 40. The biasing member 42 is positioned between the seal support member 41 and the valve guide 43, which is coupled to and at least partially extends through an inner shoulder 46 of the outer housing 31.

The valve guide 43 comprises a bore 47 through which the lower valve stem 45 extends, and an outer shoulder 48 which abuts the inner shoulder 46 of the outer housing 31. One end of the biasing member 42 pushes against the outer shoulder 48 of the valve guide 43, and the opposite end of the biasing member 42 pushes against the seal support member 41. In this arrangement, the biasing member 42 forces the upper valve head 44 and the seal 40 against an inner sealing surface 49 of the outer housing 31.

When the seal 40 is in sealing contact with the inner sealing surface 49, the plunger valve 33 of the second float valve 30 is in a closed position, which prevents fluid flow through the second float valve 30. When an amount of pressurized fluid is applied to the upper surface of the upper valve head 44 sufficient to overcome the bias force of the biasing member 42, the upper valve head 44 and the seal 40 are moved out of sealing contact with the inner sealing surface 49, thereby compressing the biasing member 42 between the seal support member 41 and the valve guide 43, and allowing fluid flow through the bore 35 and past the plunger valve 33. When the seal 40 is not in sealing contact with the inner sealing surface 49, the plunger valve 33 of the second float valve 30 is in an open position, which allows fluid flow through the second float valve 30.

The lower end of the outer housing 11 of the first float valve 10 comprises a female threaded connection 51, and the upper end of the outer housing 31 of the second float valve 30 comprises a male threaded connection 52. Alternatively, the lower end of the outer housing 11 may comprise the male threaded connection 52, and the upper end of the outer housing 31 of the second float valve 30 may comprise the female threaded connection 51. The female threaded connection 51 is threadedly coupled to the male threaded connection 52 to couple the outer housings 11, 31 together such that the first float valve 10 and the second float valve 30 are connected together in a stacked configuration. When the first and second float valves 10, 30 are coupled together in a stacked configuration, the outer housings 11, 31 are not able to move relative to each other. The benefit of the outer housings 11, 31 not being able to move relative to each other is that damage to the outer housings 11, 31 is prevented, which may be caused when pressurized fluid flows through the first and second float valves 10, 30 and forces one of the outer housings 11, 31 to impact against the other outer housing if not coupled together.

FIG. 5 is a sectional view of the float valve assembly 100 coupled to a drill string 200 in a wellbore 300, according to one embodiment. FIG. 5 illustrates the float valve assembly 100 in an open position. FIG. 6 is another sectional view of the float valve assembly 100 coupled to the drill string 200 in the wellbore 300, according to one embodiment. FIG. 6 illustrates the float valve assembly 100 in a closed position.

The drill string 200 comprises one or more tubular members coupled together above the float valve assembly 100, referred to as an upper drill string portion 200A, and below the float valve assembly 100, referred to as a lower drill string portion 200B. The lower drill string portion 200B comprises a drill bit 210 configured to drill the wellbore 300. The upper drill string portion 200A extends to the surface from which the wellbore 300 is drilled. The drill string 200 is coupled to opposite ends of a float valve sub 55 of the float valve assembly 100. Thus the float valve assembly 100 itself forms part of the drill string 200 that is lowered into the wellbore 300 to drill the wellbore 300.

The float valve sub 55 is in the form of a cylindrical body 56 having a bore 57 disposed through the float valve sub 55. The first and second float valves 10, 30 are coupled together and disposed within the bore 57 of the float valve sub 55. The lower end of the float valve sub 55 comprises a female threaded connection 58, and the upper end of the lower drill string portion 200B comprises a male threaded connection 59. The female threaded connection 58 is threadedly coupled to the male threaded connection 59 to couple the float sub 55 and the lower drill string portion 200B together such that the first and second float valves 10, 30 are secured within the float valve sub 55. Specifically, the upper end of the first float valve 10 abuts against an inner shoulder 62 of the float valve sub 55, and the upper end of the lower drill string portion 200B abuts against the lower end of the second float valve 30.

Similarly, the upper end of the float valve sub 55 comprises a female threaded connection 60, and the lower end of the upper drill string portion 200A comprises a male threaded connection 61. The female threaded connection 60 is threadedly coupled to the male threaded connection 61 to couple the float sub 55 and the upper drill string portion 200A together. Alternatively, the female and male threaded connections may be switched between the float valve sub 55 and the drill string 200.

The seal assemblies 12, 32 of the first and second float valves 10, 30 seal against an inner surface 63 of the float valve sub 55. The seal assemblies 12, 32 are configured to prevent fluid flow between the outer surface of the first and second float valves 10, 30 and the inner surface 63 of the float valve sub 55.

With reference to FIG. 5, as the drill string 200 is being lowered into and/or while drilling the wellbore 300, a fluid 350 is pumped down through the upper drill string portion 200A, through the float valve assembly 100, and out through the lower end of the lower drill string portion 200B. The fluid 350 is pumped at a pressure sufficient to overcome the bias force of the biasing members 22, 42, and move the plunger valves 13, 33 of the first and second float valves 10, 30 to an open position to allow fluid flow through the float valve assembly 100.

With reference to FIG. 6, in the event that the pressure in the wellbore 300 is sufficient to push a fluid 375 back up through the drill string 200 in the opposite direction, the fluid 375 and/or the biasing members 22, 42 then move the plunger valves 13, 33 of the first and second float valves 10, 30 to the closed position to prevent fluid flow up through the float valve assembly 100. Although the second float valve 30 itself can stop the upward fluid flow, the first float valve 10 is provided as a back-up if the second float valve 30 fails. The float valve assembly 100 allows fluid flow down and out through the lower end of the drill string 200 and prevents fluid flow back up through the drill string 200.

Figure 8:
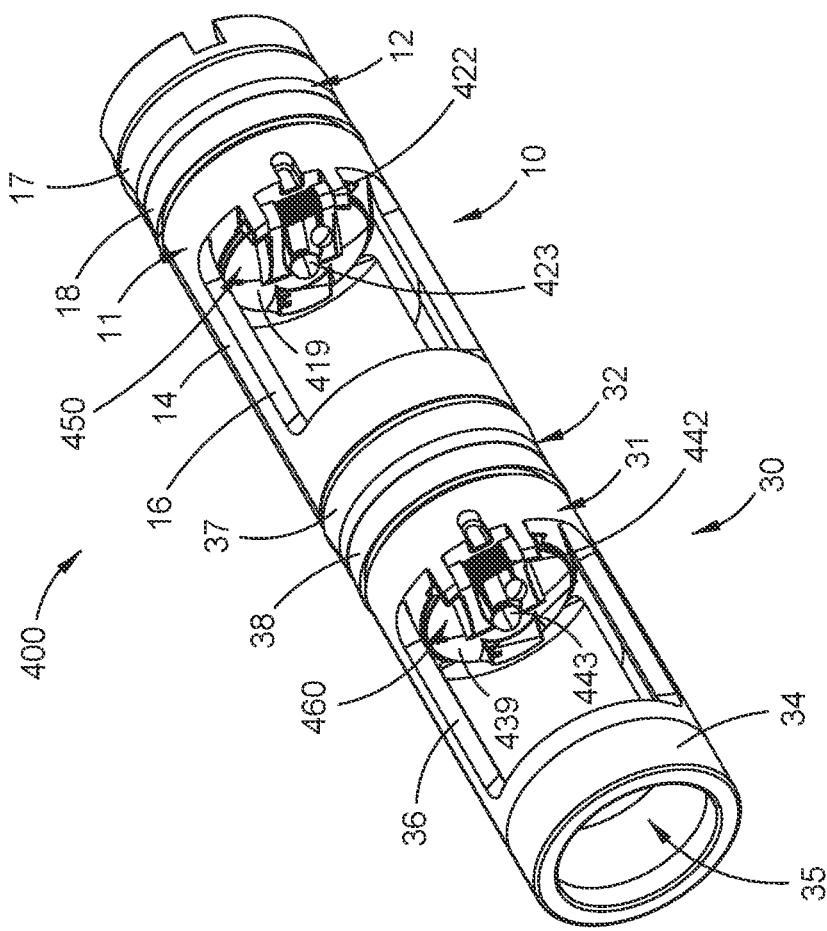
FIG. 8 is another perspective view of the float valve assembly of FIG. 7, according to one embodiment.
Figure 7:
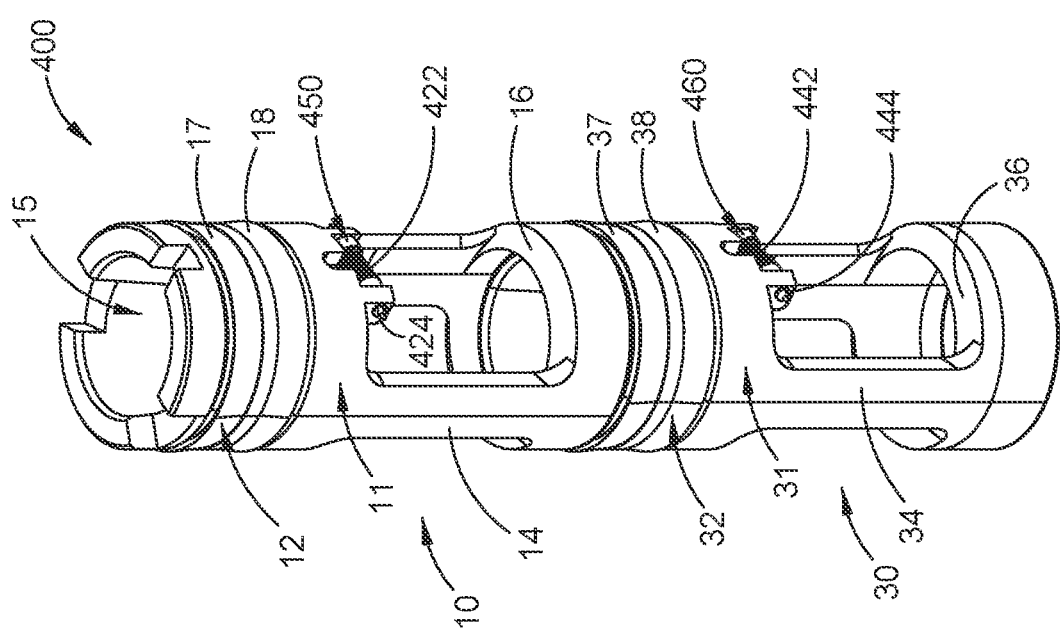
FIG. 7 is a perspective view of another float valve assembly, according to one embodiment.

FIG. 7 is a perspective view of a float valve assembly 400, according to one embodiment. FIG. 8 is another perspective view of the float valve assembly 400. FIG. 9 is a side view of the float valve assembly 400. FIG. 10 is a sectional view of the float valve assembly 400.

The float valve assembly 400 is similar to the float valve assembly 100, the primary difference being that the float valve assembly 400 comprises flapper valves 450, 460 instead of plunger valves 13, 33. Corresponding components between the float valve assembly 100 and the float valve assembly 400 are identified with the same reference numbers. A full description of the corresponding components with respect to the float valve assemblies 100, 400 will not be repeated for brevity.

The flapper valves 450, 460 are configured to allow fluid flow through the float valve assembly 400 in one direction, and prevent fluid flow through the float valve assembly 400 in the opposite direction. The first float valve 10 comprises the flapper valve 450, and the second float valve 30 comprises the flapper valve 460.

The flapper valve 450 comprises a valve member 419, a seal 420, a seal support member 421, a biasing member 422, and a biasing retention member 423. The valve member 419 is pivotably coupled to the outer housing 11 by a pin member 424 that extends through a shoulder of the outer housing 11. The seal 420 is positioned within a recessed portion formed in the bore 15 of the outer housing 11. The seal support member 421 is positioned about the seal 420 to help secure the seal 420 in place. The biasing member 422 is disposed about the pin member 424 and biases against a lower surface of the valve member 419. The biasing retention member 423 helps secure the biasing member 422 to the valve member 419. In this arrangement, the biasing member 422 forces the valve member 419 against the seal 420.

When the valve member 419 is in sealing contact with the seal 420, the flapper valve 450 of the first float valve 10 is in a closed position, which prevents fluid flow through the first float valve 10. When an amount of pressurized fluid is applied to the upper surface of the valve member 419 sufficient to overcome the bias force of the biasing member 422, the valve member 419 is moved out of sealing contact with the seal 420, thereby compressing the biasing member 422, and allowing fluid flow through the bore 15 and past the flapper valve 450. When the valve member 419 is not in sealing contact with the sea 420, the flapper valve 450 of the first float valve 10 is in an open position, which allows fluid flow through the first float valve 10.

The flapper valve 460 comprises a valve member 439, a seal 440, a seal support member 441, a biasing member 442, and a biasing retention member 443. The valve member 439 is pivotably coupled to the outer housing 31 by a pin member 444 that extends through a shoulder of the outer housing 31. The seal 440 is positioned within a recessed portion formed in the bore 35 of the outer housing 31. The seal support member 441 is positioned about the seal 440 to help secure the seal 440 in place. The biasing member 442 is disposed about the pin member 444 and biases against a lower surface of the valve member 439. The biasing retention member 443 helps secure the biasing member 442 to the valve member 439. In this arrangement, the biasing member 442 forces the valve member 439 against the seal 440.

When the valve member 439 is in sealing contact with the seal 440, the flapper valve 460 of the second float valve 30 is in a closed position, which prevents fluid flow through the second float valve 30. When an amount of pressurized fluid is applied to the upper surface of the valve member 439 sufficient to overcome the bias force of the biasing member 442, the valve member 439 is moved out of sealing contact with the seal 440, thereby compressing the biasing member 442, and allowing fluid flow through the bore 35 and past the flapper valve 460. When the valve member 439 is not in sealing contact with the sea 440, the flapper valve 460 of the second float valve 30 is in an open position, which allows fluid flow through the second float valve 30.

FIG. 11 is a sectional view of the float valve assembly 400 coupled to the drill string 200 in the wellbore 300, according to one embodiment. FIG. 11 illustrates the float valve assembly 400 in an open position. FIG. 12 is another sectional view of the float valve assembly 400 coupled to the drill string 200 in the wellbore 300, according to one embodiment. FIG. 12 illustrates the float valve assembly 400 in a closed position.

Similar to the float valve assembly 100, the drill string 200 is coupled to opposite ends of the float valve sub 55 of the float valve assembly 400. Thus the float valve assembly 400 itself forms part of the drill string 200 that is lowered into the wellbore 300 to drill the wellbore 300.

With reference to FIG. 11, as the drill string 200 is being lowered into and/or while drilling the wellbore 300, the fluid 350 is pumped down through the upper drill string portion 200A, through the float valve assembly 400, and out through the lower end of the lower drill string portion 200B. The fluid 350 is pumped at a pressure sufficient to overcome the bias force of the biasing members 422, 442, and move the flapper valves 450, 460 of the first and second float valves 10, 30 to an open position to allow fluid flow through the float valve assembly 400.

With reference to FIG. 12, in the event that the pressure in the wellbore 300 is sufficient to push the fluid 375 back up through the drill string 200 in the opposite direction, the fluid 375 and the biasing members 422, 442 then move the flapper valves 450, 460 of the first and second float valves 10, 30 to the closed position to prevent fluid flow up through the float valve assembly 400. Although the second float valve 30 itself can stop the upward fluid flow, the first float valve 10 is provided as a back-up if the second float valve 30 fails. The float valve assembly 400 allows fluid flow down and out through the lower end of the drill string 200 and prevents fluid flow back up through the drill string 200.

Figure 13A:
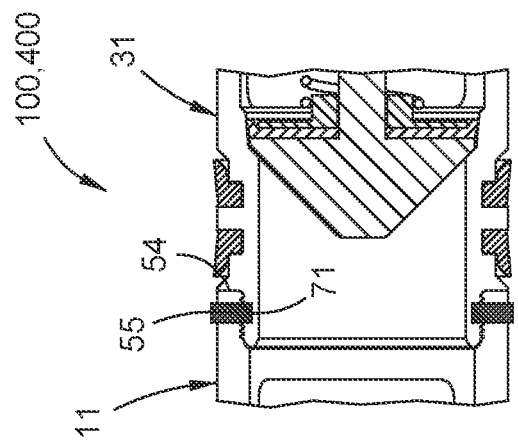
FIGS. 13A, 13B, and 13C illustrate different types of connections that can be used between outer housings of the float valve assembly of FIGS. 1 and 7.
Figure 13B:
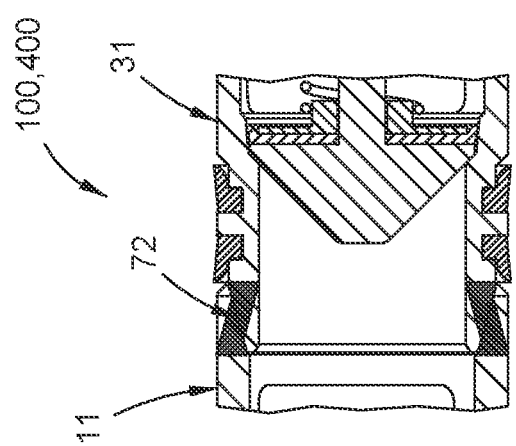
Figure 13C:
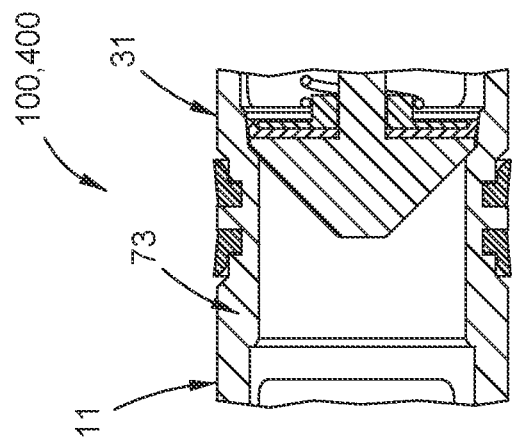

FIGS. 13A, 13B, and 13B illustrate different types of connections that can be used to couple the outer housings 11, 31 together for either float valve assembly 100, 400. FIG. 13A illustrates that the outer housings 11, 31 can be coupled together by a welded connection 54, and/or by a set screw/pin connection comprising one or more set screws or pins 55 that can be disposed through the side wall of the outer housing 11 and protrude into one or more corresponding slots or holes 71 in the side wall of the outer housing 31. FIG. 13B illustrates that the outer housings 11, 31 can be coupled together by a conical, taper, cam, magnetic, spring enabled, and/or glue type lock, schematically illustrated as a locking connection 72, that is integrally formed with or coupled to the connecting ends of the outer housings 11, 31. FIG. 13C illustrates that the outer housings 11, 31 may be integrally formed as a single, monolithic outer housing 73 configured to support both of the plunger valves 13, 33 and/or the flapper valves 450, 460.

Any one or more components of the float valve assemblies 100, 400 may be integrally formed together, directly coupled together, and/or indirectly coupled together, and are not limited to the specific arrangement of components illustrated in FIGS. 1-12, 13A, 13B, and/or 13C.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The disclosure also contemplates that one or more aspects of the embodiments described herein may be substituted in for one or more of the other aspects described. The scope of the disclosure is determined by the claims that follow.

We claim:

1. A float valve assembly, comprising:
   a float sub;
   a first float valve having a first outer housing and a first seal assembly including a first upper seal and a first lower seal each disposed about the first outer housing; and
   a second float valve having a second outer housing and a second seal assembly including a second upper seal and a second lower seal each disposed about the second outer housing, wherein:
      the first outer housing and the second outer housing are coupled together and disposed within the float sub in a stacked configuration such that the first outer housing and the second outer housing are prevented from moving independently from one another;
      the first float valve and second float valve each comprise valves configured to allow fluid flow through the first and second float valves in a first direction and prevent fluid flow through the first and second float valves in an opposite direction; and
      the first seal assembly and the second seal assembly seal against an inner surface of the float sub.

2. The float valve assembly of claim 1, wherein the valves are plunger valves.

3. The float valve assembly of claim 1, wherein the valves are flapper valves.

4. The float valve assembly of claim 1, wherein the first outer housing and the second outer housing are coupled together by a threaded connection.

5. The float valve assembly of claim 1, wherein the first outer housing and the second outer housing are coupled together by a welded connection.

6. The float valve assembly of claim 1, wherein the first outer housing and the second outer housing are coupled together by a set screw/pin connection.

7. The float valve assembly of claim 6, wherein the set screw/pin connection comprises one or more set screws or pins disposed through a side wall of one of the first and second outer housings and protruding into one or more corresponding slots or holes in a side wall of the other of the first and second outer housings.

8. The float valve assembly of claim 1, wherein the first outer housing and the second outer housing are coupled together by a locking connection comprising a conical, taper, cam, magnetic, spring enabled, and/or glue type lock.

9. The float valve assembly of claim 1, wherein the first outer housing and the second outer housing are integrally formed together as a single, monolithic outer housing.

10. A drill string assembly, comprising:
an upper drill string portion;
a lower drill string portion; and
a float valve assembly, comprising:
a float sub;
a first float valve having:
a first outer housing;
a first valve; and
a first seal assembly including a first upper seal and a first lower seal each disposed about the first outer housing; and
a second float valve having:
a second outer housing;
a second valve; and
a second seal assembly including a second upper seal and a second lower seal each disposed about the second outer housing, wherein:
the first outer housing and the second outer housing are coupled together and disposed within the float sub in a stacked configuration such that the first outer housing and the second outer housing are prevented from moving independently from one another;
the first seal assembly and the second seal assembly seal against an inner surface of the float sub;
the first and second valves are configured to allow fluid flow through the first and second float valves in a first direction and prevent fluid flow through the first and second float valves in an opposite direction; and
the float sub is disposed between the upper drill string portion and the lower drill string portion.

11. The drill string assembly of claim 10, wherein the first and second seal assemblies are configured to prevent fluid flow between the outer surfaces of the first and second outer housings and the inner surface of the float sub.

12. The drill string assembly of claim 10, wherein the float sub is threadedly coupled to the upper drill string portion and the lower drill string portion.

13. The drill string assembly of claim 10, wherein the first float valve and the second float valve are plunger valves.

14. The drill string assembly of claim 10, wherein the first float valve and the second float valve are flapper valves.

15. A method for drilling a wellbore comprising:
lowering a drill string assembly to drill the wellbore, the drill string assembly comprising:
an upper portion of a drill string;
a lower portion of the drill string; and
a float valve assembly, comprising:
a float sub;
a first float valve having:
a first outer housing;
a first valve, wherein the first valve is movable between an open position and a closed position; and
a first seal assembly including a first upper seal and a first lower seal each disposed about the first outer housing; and
a second float valve having:
a second outer housing;
a second valve, wherein the second valve is movable between an open position and a closed position; and
a second seal assembly including a second upper seal and a second lower seal each disposed about the second outer housing, wherein:
the first outer housing and the second outer housing are coupled together and disposed within the float sub in a stacked configuration such that the first outer housing and the second outer housing are prevented from moving independently from one another;
the first and second valves are configured to allow fluid flow through the first and second float valves in a first direction in the open position and prevent fluid flow through the first and second float valves in an opposite direction in the closed position; and
the first seal assembly and the second seal assembly seal against an inner surface of the float sub; and
pumping fluid through the drill string assembly in a downhole direction while drilling the wellbore.

16. The method of claim 15, wherein:
the fluid is pumped at a pressure that moves the first and second float valves into the open position to allow fluid flow in the downhole direction through the float valve assembly and the lower portion of the drill string.

17. The method of claim 16, wherein:
at least one of the first and second float valves moves into the closed position to block fluid flow from the wellbore in an uphole direction through the float valve assembly.

* * * * *